US009358747B2

(12) United States Patent
Gärdin

(10) Patent No.: US 9,358,747 B2
(45) Date of Patent: Jun. 7, 2016

(54) HOT ISOSTATIC PRESSING ARRANGEMENT

(75) Inventor: Mats Gärdin, Västerås (SE)

(73) Assignee: AVURE TECHNOLOGIES AB, Vasteras (SE)

( * ) Notice: Subject to any disclaimer, the term of this patent is extended or adjusted under 35 U.S.C. 154(b) by 864 days.

(21) Appl. No.: 12/735,043

(22) PCT Filed: Dec. 14, 2007

(86) PCT No.: PCT/EP2007/010997

§ 371 (c)(1), (2), (4) Date: Sep. 3, 2010

(87) PCT Pub. No.: WO2009/076973

PCT Pub. Date: Jun. 25, 2009

(65) Prior Publication Data

US 2011/0008741 A1 Jan. 13, 2011

(51) Int. Cl.

| | |
|---|---|
| *B22F 3/15* | (2006.01) |
| *F27D 7/00* | (2006.01) |
| *F27D 15/02* | (2006.01) |
| *B01J 3/04* | (2006.01) |
| *B27B 1/00* | (2006.01) |

(Continued)

(52) U.S. Cl.

CPC ............... *B30B 11/002* (2013.01); *B22F 3/003* (2013.01); *B22F 2999/00* (2013.01)

(58) Field of Classification Search

None

See application file for complete search history.

(56) References Cited

U.S. PATENT DOCUMENTS

| | | | | |
|---|---|---|---|---|
| 4,022,446 | A * | 5/1977 | Smith et al. | 266/252 |
| 4,131,419 | A * | 12/1978 | Isaksson | 432/205 |

(Continued)

FOREIGN PATENT DOCUMENTS

| | | |
|---|---|---|
| CN | 1642681 | 7/2005 |
| EP | 0185947 A1 | 7/1986 |

(Continued)

OTHER PUBLICATIONS

English translation of Chinese Office Action dated Jan. 31, 2012.

(Continued)

*Primary Examiner* — Gregory Huson
*Assistant Examiner* — Eric Gorman
(74) *Attorney, Agent, or Firm* — Harness, Dickey & Pierce, P.L.C.

(57) ABSTRACT

In an aspect of at least one embodiment of the invention, there is provided a hot isostatic pressing arrangement for treatment of articles by hot isostatic pressing. The arrangement includes a pressure vessel including a furnace chamber including a heat insulated casing and a furnace for heating of a pressure medium during pressing, and a 'heat exchanger unit' or heat absorbing material located below the furnace chamber. In another aspect of at least one embodiment of the invention, there is provided a method for treatment of articles in a hot isostatic press. The press further includes a pressure vessel enclosing a furnace chamber and a 'heat exchanger unit'. The method includes the steps of loading the articles into the furnace chamber, performing pressurized and heated treatment of the articles, cooling the articles and unloading of the articles. All the steps are performed while the 'heat exchanger unit' remains located inside the pressure vessel. Heat is transferred to and from the 'heat exchanger unit' at different portions of the hot isostatic pressing cycle.

19 Claims, 8 Drawing Sheets

(51) Int. Cl.

| | |
|---|---|
| ***B30B 5/02*** | (2006.01) |
| ***F27B 17/00*** | (2006.01) |
| ***B29C 43/10*** | (2006.01) |
| ***B22F 3/14*** | (2006.01) |
| ***F27B 5/04*** | (2006.01) |
| ***F27D 7/06*** | (2006.01) |
| ***B30B 11/00*** | (2006.01) |
| ***B22F 3/00*** | (2006.01) |

(56) References Cited

U.S. PATENT DOCUMENTS

| | | | | |
|---|---|---|---|---|
| 4,151,400 | A | 4/1979 | Smith, Jr. et al. | |
| 4,235,592 | A * | 11/1980 | Smith et al. | 432/205 |
| 4,246,957 | A * | 1/1981 | Smith et al. | 165/61 |
| 4,280,807 | A * | 7/1981 | Smith et al. | 432/205 |
| 4,532,984 | A * | 8/1985 | Smith, Jr. | 165/61 |
| 4,756,680 | A * | 7/1988 | Ishii | 425/78 |
| 4,909,313 | A * | 3/1990 | Voss et al. | 165/78 |
| 4,921,666 | A * | 5/1990 | Ishii | 419/25 |
| 4,930,316 | A * | 6/1990 | Bonham, Jr. | 60/641.5 |
| 4,963,091 | A * | 10/1990 | Hoetzl et al. | 432/176 |
| 4,974,663 | A * | 12/1990 | Nakaji | 165/61 |
| 5,118,289 | A * | 6/1992 | Bergman et al. | 432/205 |
| 5,123,832 | A * | 6/1992 | Bergman et al. | 425/405.2 |
| 5,251,880 | A * | 10/1993 | Ishii et al. | 266/44 |
| 5,863,326 | A * | 1/1999 | Nause et al. | 117/217 |
| 5,900,060 | A * | 5/1999 | Nause et al. | 117/223 |
| 6,250,907 | B1 * | 6/2001 | Bergman | 425/210 |
| 6,331,271 | B1 * | 12/2001 | Bergman | 419/49 |
| 6,514,066 | B1 * | 2/2003 | Bergman | 425/405.2 |
| 6,554,922 | B2 * | 4/2003 | Loeser | 148/511 |
| 7,687,024 | B2 * | 3/2010 | Bergman | 419/49 |
| 8,272,429 | B2 * | 9/2012 | Inatomi | F28D 7/0025 165/135 |
| 8,647,092 | B2 * | 2/2014 | Nakai et al. | 425/78 |
| 2002/0036075 | A1 * | 3/2002 | Loeser | 165/11.1 |
| 2002/0134544 | A1 * | 9/2002 | DeVilbiss | F24F 5/0042 165/287 |
| 2003/0197295 | A1 | 10/2003 | Nakai et al. | |
| 2006/0201221 | A1 * | 9/2006 | Sehlstedt | 72/201 |
| 2007/0228596 | A1 * | 10/2007 | Fujikawa et al. | 264/85 |
| 2007/0266866 | A1 * | 11/2007 | Yamauchi | B22F 3/03 100/323 |
| 2010/0186608 | A1 | 7/2010 | Bergman | |
| 2011/0165283 | A1 * | 7/2011 | Nakai et al. | 425/405.2 |
| 2012/0269920 | A1 * | 10/2012 | Thunholm | 425/405.2 |
| 2013/0071508 | A1 * | 3/2013 | Nakai et al. | 425/405.2 |
| 2013/0291562 | A1 * | 11/2013 | Edwards | F25B 21/02 62/3.3 |
| 2013/0291563 | A1 * | 11/2013 | Edwards | F25B 21/04 62/3.3 |
| 2013/0337395 | A1 * | 12/2013 | Gardin | 432/205 |
| 2013/0344451 | A1 * | 12/2013 | Gardin | 432/29 |
| 2014/0127637 | A1 * | 5/2014 | Gardin | 432/201 |
| 2014/0272745 | A1 * | 9/2014 | Gardin | 432/24 |

FOREIGN PATENT DOCUMENTS

| | | | |
|---|---|---|---|
| EP | 1127639 | A2 | 8/2001 |
| JP | 54134532 | | 12/1978 |
| JP | 55-099737 | | 7/1980 |
| JP | 5987032 | | 5/1984 |
| JP | 68-58770 | | 12/1987 |
| JP | 04-240389 | | 8/1992 |
| JP | 06011268 | A | 1/1994 |
| JP | H0625711 | A | 2/1994 |
| JP | 08029069 | A | 2/1996 |
| JP | 09-133470 | | 5/1997 |
| JP | 2003290987 | A | 10/2003 |
| JP | 2007308786 | A | 11/2007 |
| JP | 2007309548 | A | 11/2007 |
| JP | 2007309626 | A | 11/2007 |
| JP | 05599737 | | 8/2014 |
| RU | 2302924 | | 7/2007 |
| WO | WO 03/070402 | | 8/2003 |

OTHER PUBLICATIONS

English translation of Russian Office Action dated Jul. 21, 2011.

Summons to Attend Oral Proceedings dated Dec. 4, 2014 in corresponding European Patent Application No. 07866238.4.

Office Action dated Nov. 4, 2014, from corresponding Japanese Patent Application No. 2013-246755.

International Search Report.

English translation of Japanese Office Action dated Jul. 24, 2012.

* cited by examiner

HOT ISOSTATIC PRESSING ARRANGEMENT

TECHNICAL FIELD OF THE INVENTION

The present invention relates to an arrangement for treatment of articles by hot isostatic pressing and to treatment of articles by hot isostatic pressing.

BACKGROUND OF THE INVENTION

Hot isostatic pressing (HIP) is a technology that finds more and more widespread use. Hot isostatic pressing is for instance used in achieving elimination of porosity in castings, such as for instance turbine blades, in order to substantially increase their service life and strength, in particular the fatigue strength. Another field of application is the manufacture of products, which are required to be fully dense and to have pore-free surfaces, by means of compressing powder.

In hot isostatic pressing, an article to be subjected to treatment by pressing is positioned in a load compartment of an insulated pressure vessel. A cycle, or treatment cycle, comprises the steps of: loading, treatment and unloading of articles, and the overall duration of the cycle is herein referred to as the cycle time. The treatment may, in turn, be divided into several portions, or phases, such as a pressing phase, a heating phase, and a cooling phase.

After loading, the vessel is sealed off and a pressure medium is introduced into the pressure vessel and the load compartment thereof. The pressure and temperature of the pressure medium is then increased, such that the article is subjected to an increased pressure and an increased temperature during a selected period of time. The temperature increase of the pressure medium, and thereby of the articles, is provided by means of a heating element or furnace arranged in a furnace chamber of the pressure vessel. The pressures, temperatures and treatment times are of course dependent on many factors, such as the material properties of the treated article, the field of application, and required quality of the treated article. The pressures and temperatures in hot isostatic pressing may typically range from 200 to 5000 bars and from 300 to 3000° C., respectively.

When the pressing of the articles is finished, the articles often need to be cooled before being removed, or unloaded, from the pressure vessel. In many kinds of metallurgical treatment, the cooling rate will affect the metallurgical properties. For example, thermal stress (or temperature stress) and grain growth should be minimized in order to obtain a high quality material. Thus, it is desired to cool the material homogeneously and, if possible, to control the cooling rate. Many presses known in the art suffer from slow cooling of the articles, efforts have therefore been made to reduce the cooling time of the articles.

In U.S. Pat. No. 5,118,289, there is provided a hot isostatic press adapted to rapidly cool the articles after completed pressing and heating treatment. The press comprises a pressure vessel, having an outer wall, end closures, and a hot zone surrounded by thermal barriers. The outer wall of the pressure vessel is cooled from the outside. The hot zone is arranged to receive articles to be treated. Between the thermal barriers and the pressure vessel with end closures, there are colder spaces, or zones. As in conventional hot isostatic presses, the pressure medium is heated during pressing of the articles, which are placed in the hot zone as mentioned above.

Further, in the press disclosed in U.S. Pat. No. 5,118,289, during cooling of the articles, cooled pressure medium is introduced into the hot zone, whereby thermal energy is transferred from the articles to the pressure medium. Thus, the temperature of the pressure medium will increase during the passage through the hot zone and the temperature of the articles will decrease. When leaving the hot zone, the relatively hot pressure medium will reach the walls of the pressure vessel. In a conventional hot isostatic press, the amount of hot pressure medium reaching the walls of pressure vessel must be carefully controlled in order not to overheat the walls of the pressure vessel, i.e. every interior surface of the press coming in contact with the hot pressure medium. This means that the cooling must be performed at a relatively slow pace, i.e. not faster than the pressure vessel can withstand over time.

The press in the above mentioned U.S. Pat. No. 5,118,289, however, further comprises a heat exchanger, which is located above the hot zone, in order be able to decrease the time for cooling of articles. Thereby, the pressure medium will be cooled by the heat exchanger before it makes contact with the pressure vessel wall. Consequently, the heat exchanger allows for an increased cooling capacity without the risk of overheating the wall of the pressure vessel. Further, as in conventional hot isostatic presses, the pressure medium is cooled when passing through a gap between the pressure vessel wall and the thermal barriers during cooling of articles. When the cooled pressure medium reaches the bottom of the pressure vessel, it re-enters the hot zone (in which the articles to be cooled are located) via a passage through the thermal barrier.

The heat exchanger becomes hot during cooling of the pressure medium and the articles, and, in order to function as a booster during the cooling of articles, the heat exchanger must be cooled before the press may be operated to treat a new set of articles. Thus, a drawback of this type of press is that the time between subsequent cycles is dependent on the cooling time of the heat exchanger. In order to overcome this problem, one approach is to employ two heat exchangers. With two heat exchangers, one heat exchanger may be cooled outside the hot isostatic press, while the other is used in the hot isostatic pressing procedure. However, this results in the drawback of having to exchange the heat exchangers before each pressing operation. Additionally, the use of two heat exchangers, of course, increases costs for the pressing arrangement.

SUMMARY OF THE INVENTION

An object of the present invention is to provide an improved hot isostatic press, which eliminates or at least reduces at least one of the above mentioned problems.

This object is met by a hot isostatic pressing arrangement as set forth in the appended independent claim. Further embodiments are defined in the dependent claims.

In a first aspect of the invention, there is provided a hot isostatic pressing arrangement for treatment of articles by hot isostatic pressing. The hot isostatic pressing arrangement comprises a pressure vessel, including a furnace chamber, which comprises a heat insulated casing and a furnace for heating of a pressure medium during pressing. The furnace chamber is arranged to receive the articles. Further, the pressure vessel includes a heat exchanger unit, which is located below the furnace chamber and is arranged for exchanging thermal energy with the pressure medium.

Thus, the invention is based on the idea of providing a heat exchanger unit and using the pressure medium to cool the heat exchanger unit. This is realized by means of arranging the heat exchanger unit inside the pressure vessel and below the furnace chamber, where the heat exchanger unit may exchange thermal energy with the pressure medium. Then, the heat exchanger unit may be exposed to colder portions of pressure medium, which due to differences in density between hotter and colder portions, will strive downwards in the pressure vessel to the bottom thereof. Thus, instead of arranging the heat exchanger unit above the furnace chamber, where the pressure medium can be expected to be hotter than in the lower portion of the vessel, the heat exchanger unit is arranged below the furnace chamber, where the pressure can be expected to be colder. Thereby, the colder pressure medium may be used for reducing the temperature of the heat exchanger unit.

During cooling of the articles, which follows completion of the heating and pressing portion of the treatment cycle, heat (or thermal energy) is transferred from the pressure medium to the heat exchanger unit. Prior to operating the press for cooling of articles again in a subsequent treatment cycle, thermal energy must be dissipated from the heat exchanger unit. This is achieved by means of directing a flow of colder pressure medium through the warmer heat exchanger unit. Hence, heat is transferred to and from the heat exchanger unit at different portions of the hot isostatic pressing cycle, or treatment cycle.

In this manner, the present invention provides the advantage of significantly facilitating the operation of the pressing arrangement, since the exchanger does not need to be moved or replaced between cycles.

In addition, the costs for the pressing arrangement may be reduced due to the fact that only one heat exchanger needs to be employed for one pressing arrangement.

A further advantage of arranging the heat exchanger unit at the bottom of the press is that easy access, through an opening at the top of the pressure vessel for loading and unloading of articles, to the furnace chamber and a load compartment is provided.

In order for the walls of the pressure vessel to sustain the high temperatures and pressures of the hot isostatic pressing process, the hot isostatic press is preferably provided with means for cooling the pressure vessel. For instance, the means for cooling may be a coolant, such as water. The coolant may be arranged to flow along the outer wall of the pressure vessel in a pipe system, or cooling channels, in order to keep the wall temperature at a suitable level.

Further, the heat insulated casing of the furnace chamber comprises a lower heat insulating portion and the heat exchanger unit is located below the lower heat insulating portion of the casing. Consequently, the heat exchanger unit is separated and thermally insulated from the articles within the furnace chamber. Thereby, a hot zone within the furnace chamber is effectively insulated from a cold zone in the lower portion of the hot isostatic pressing arrangement.

The hot isostatic pressing arrangement, according to embodiments of the invention, comprises a first and a second guiding passage, or channel. The first guiding passage is formed between the furnace chamber casing and an outer wall of the pressure vessel. The casing comprises a heat insulating portion and a housing, arranged to surround the heat insulated portion. The second guiding passage is, thus, formed between the heat insulating portion and the housing. The first guiding passage is mainly arranged to guide the pressure medium in the downward direction along the inside of the surrounding, or outer, wall of the pressure vessel. The second guiding passage is mainly arranged to guide the pressure medium in the upward direction along the outer wall of the furnace chamber, i.e. the housing of the furnace chamber.

When the pressure medium is brought into contact with the pressure vessel wall, thermal energy is exchanged between the pressure medium and the wall, which—as stated above—may be cooled by a coolant from the outside of the pressure vessel. In this manner, the pressing arrangement is, advantageously, arranged to circulate the pressure medium within the pressure vessel, thereby creating an outer, passive convection loop. The purpose of the outer convection loop is to enable cooling of the pressure medium during cooling of the articles and to enable cooling of the heat exchanger unit during heating of the articles.

Advantageously, this embodiment makes it possible to cool the heat exchanger unit during pressing and heating of the articles, that is thermal heat is transferred from the pressure medium to the heat exchanger unit during cooling of articles and from the heat exchanger unit to the pressure medium during pressing and heating of articles. In this manner, the cycle time may be reduced, since after cooling of the articles the press may be immediately operated to press and heat a new set of articles.

According to further embodiments of the present invention, the hot isostatic pressing arrangement also comprises a flow generator, located beneath the furnace chamber in the vicinity of the heat exchanger unit. The flow generator enhances circulation of the pressure medium within the pressure vessel, i.e. in the outer convection loop. The flow generator may, for example, be in the form of a fan, a pump, an ejector, or the like.

The furnace chamber may further comprise a further guiding passage, which is formed between the heat insulated casing of the furnace chamber and the load compartment.

Additionally, there may be located a further flow generator within the furnace chamber for circulating the pressure medium therein, thereby creating an even temperature distribution. The flow generator will force the pressure medium upwards through the load compartment and downwards through said further guiding passage. As a result, an inner, active convection loop is created. Said further flow generator, such as a fan, a pump, an ejector, or the like, may be used for controlling the inner, active convention loop.

In the outer convection loop, the pressure medium is cooled at the outer walls of the pressure vessel, i.e. at the inner surface of the pressure vessel, where the pressure medium flows towards the bottom of the pressing arrangement. At the bottom of the pressing arrangement, a portion of the pressure medium may be forced back into the furnace chamber, in which it is heated by the articles (or load) during rapid cooling. Then, the pressure medium will, due to the flow generator, advance upwards towards the top of the furnace chamber, as described above for the inner convection loop.

Additionally, the pressure vessel may contain a guiding arrangement for directing and guiding the flow of pressure medium past or through the heat exchanger unit. When the flow is directed past the heat exchanger unit, thermal energy exchange between the pressure medium and the heat exchanger unit is intended to be essentially avoided. On the other hand, when the flow is guided, or directed, through the heat exchanger unit, thermal energy exchange between the pressure medium and the heat exchanger unit is enabled. Hence, the guiding arrangement provides the ability for controlling when the cooling effect of the heat exchanger unit may be applied, i.e. the booster effect of the heat exchanger unit may be chosen to be applied at a selected time period of the cooling portion of the treatment cycle. It is, however, also possible to control the cooling effect of the heat exchanger unit by means of, for example, adjustable restrictions, for instance in the form of valves, in said first guiding passage.

Moreover, the guiding arrangement may comprise a first valve arrangement arranged peripherally around the heat exchanger unit, thereby making it possible to improve the control of the flow of the pressure medium from the first guiding passage to pass by or through the heat exchanger unit. In this context, the term "peripherally" is intended to cover locations of the first valve arrangement radially of the heat exchanger unit, independently of the location along a longitudinal axis of the, preferably cylindrical, pressure vessel. Further, the first valve arrangement may partially or completely cover the periphery of the pressure vessel, i.e. there is no dependence on the angular position along the periphery of the heat exchanger unit.

Furthermore, the guiding arrangement may comprise a second valve arrangement and wherein the heat exchanger unit is arranged peripherally of said second valve arrangement. Thereby, an improvement of the control of the flow of the pressure medium from the first guiding passage through or past the heat exchanger unit may be achieved. Similarly, according to the above, the term "peripherally" used in this context intends to cover locations of the heat exchanger unit radially of the second valve arrangement, independently of the location along the longitudinal axis of the pressure vessel. In addition, analogous as for the first valve arrangement, the heat exchanger unit may partially or completely cover the periphery of the second valve arrangement, i.e. the location of the heat exchanger unit is independent on the angular position along the periphery of the second valve arrangement.

It is also possible to combine the first and the second valve arrangement, such as to obtain an even more improved control of the flow of the pressure medium. This is described in more detail, by way of example only, in the detailed description below.

BRIEF DESCRIPTION OF THE DRAWINGS

The various aspects of the invention, including its particular features and advantages, will be readily understood from the following detailed description and the accompanying drawings. In the following Figures, like reference numerals denote like elements or features of embodiments of the present invention throughout. Further, reference numerals for symmetrically located items, elements or feature indicators are only denoted once in the Figures. On the drawings.

DETAILED DESCRIPTION OF PREFERRED EMBODIMENTS OF THE INVENTION

Figure 1:
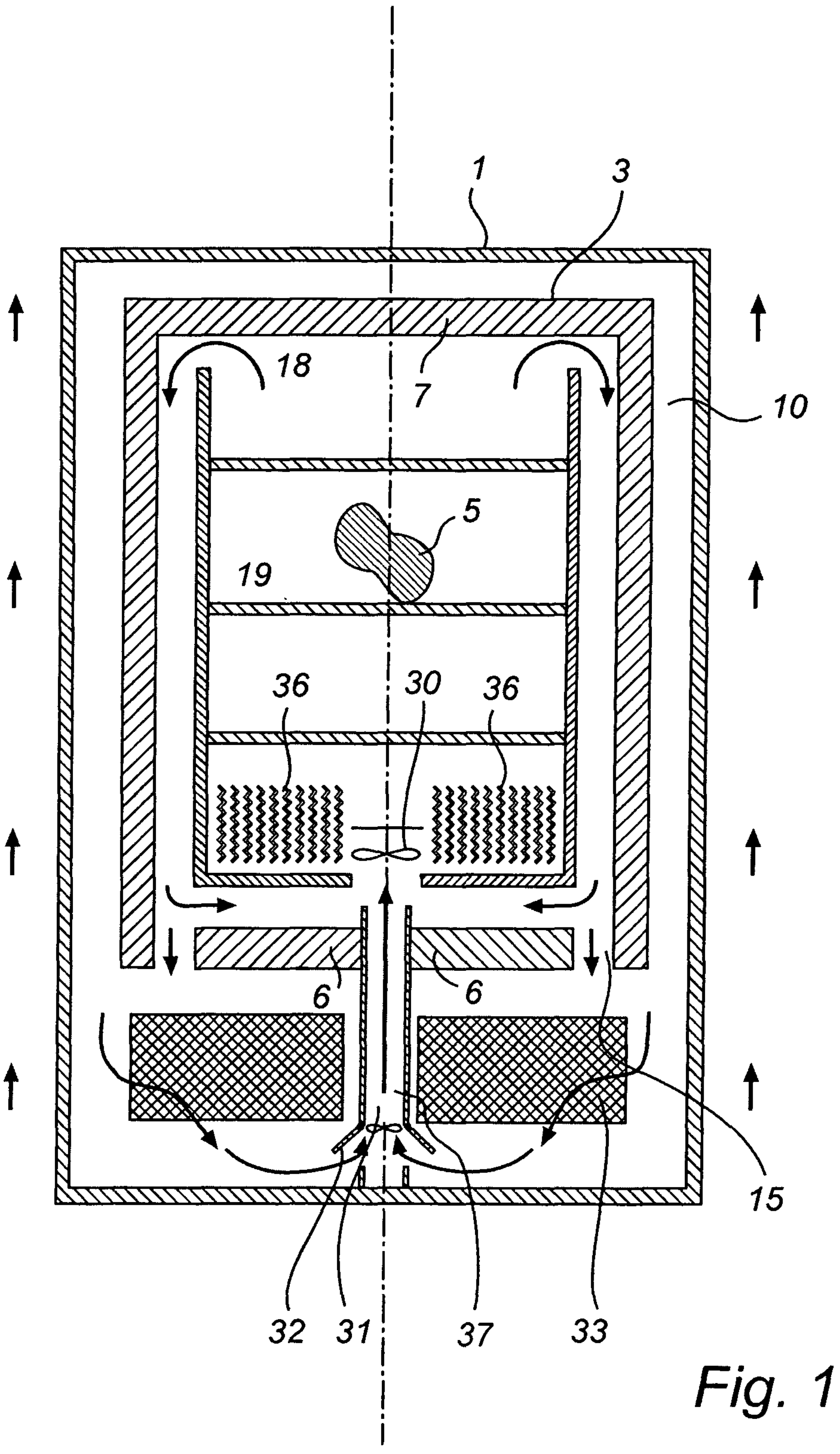
FIG. 1 is a side view of a pressing arrangement according to an embodiment of the invention during the phase of super rapid cooling.

The following is a description of exemplifying embodiments in accordance with the present invention. This description is intended for the purpose of explanation only and is not to be taken in a limiting sense. It should be noted that the drawings are schematic and that the pressing arrangements of the described embodiments may comprise a number of features and elements that are not, for the sake of simplicity, indicated in the drawings.

Embodiments of the pressing arrangement according to the present invention may be used to treat, through hot isostatic pressing, articles made of a number of different materials.

Figure 2:
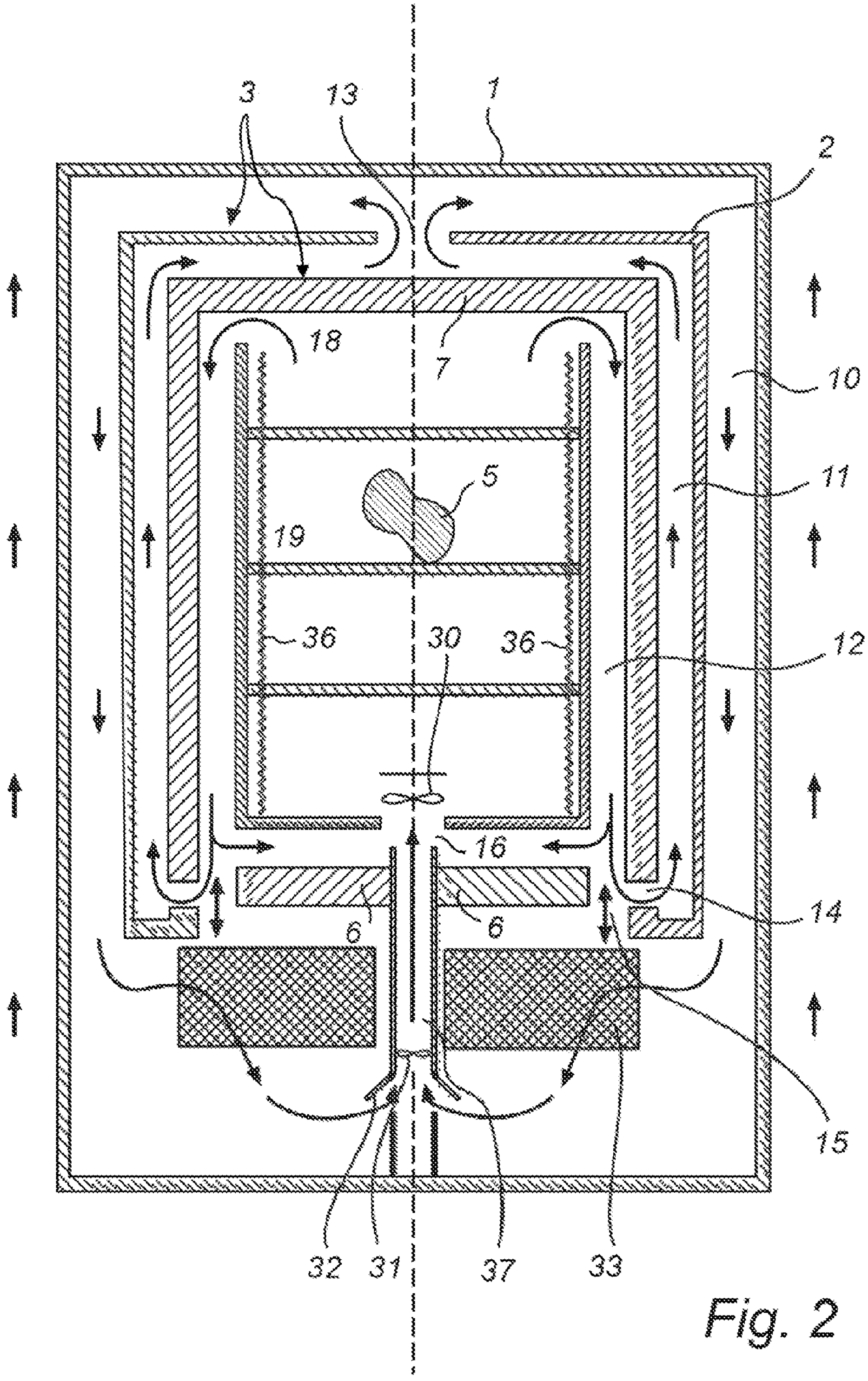
FIG. 2 is a side view of a pressing arrangement according to another embodiment of the invention during the phase of super rapid cooling.

With reference to FIG. 1, there is shown a pressing arrangement according to an embodiment of the invention. The pressing arrangement, which is intended to be used for pressing of articles, comprises a pressure vessel 1 with means (not shown), such as one or more ports, inlets and outlets, for supplying and discharging pressure medium. The pressure vessel 1 includes a furnace chamber 18, which comprises a furnace (or heater) 36, or heating elements, for heating of the pressure medium during the pressing portion of the treatment cycle. The furnace 36 may, as indicated in for example FIG. 1, be located at the lower portion of the furnace chamber 18, or, as indicated in FIG. 2, be located at the sides of the furnace chamber 18. A man skilled in the art realizes that it is also possible to combine heating elements at the sides with heating elements at the bottom such as to achieve a furnace, which is located at the sides and at the bottom of the furnace chamber. It is a matter of course that any implementation of the furnace regarding placement of heating elements, known in the art, may be applied to the embodiments shown herein.

It is to be noted that the term "furnace" refers to the means for heating, while the term "furnace chamber" refers to the volume in which load and furnace are located.

The furnace chamber 18 further includes a load compartment 19 for receiving and holding articles 5 to be treated. In the furnace chamber 18, there is also located a fan 30 for circulating the pressure medium within the furnace chamber 18 and enhance an inner convection loop, in which pressure medium has an upward flow through the load compartment and a downward flow along a peripheral portion 12 of the furnace chamber. The furnace chamber 18 is surrounded by a heat insulated casing 3. The bottom of the casing 3 comprises a lower heat insulating portion 6, which is provided with a passage 37 for supplying pressure medium to the furnace chamber 18.

Further, the pressure vessel 1 comprises a heat exchanger unit 33 located at the bottom of the pressure vessel 1, beneath the furnace chamber 18 as well as the lower heat insulating portion 6. The heat exchanger unit 33 is arranged to exchange, dissipate and/or absorb, thermal energy with the pressure medium.

The pressure vessel 1 further comprises a fan 31, which is located beneath the furnace chamber 18, for guiding pressure medium into the furnace chamber.

Moreover, the outer wall of the pressure vessel 1 may be provided with channels, or tubes (not shown), in which a coolant for cooling may be provided. In this manner, the vessel wall may be cooled in order to protect it from detrimental heat. The coolant is preferably water, but other coolants are also contemplated. The flow of coolant is indicated in FIG. 1 by the arrows on the outside of the pressure vessel.

Even though it is not shown in the figures, the pressure vessel 1 may be opened, such that the articles within the pressure vessel 1 can be removed. This may be realized in a number of different manners, all of which being apparent to a man skilled in the art.

Operation of an exemplary pressing arrangement in accordance with embodiments of the present invention will now be described. In the following description, a treatment cycle may comprise several phases, such as loading phase, pressing and/or heating phase, cooling phase, rapid cooling phase, super rapid cooling phase and unloading phase.

First, the pressure vessel 1 is opened such that the furnace chamber 18, and the load compartment 19 thereof, may be accessed. This can be accomplished in a number of different manners known in the art and no further description thereof is required for understanding the principles of the invention.

Then, the articles to be pressed are positioned in the load compartment 19 and the pressure vessel 1 is closed.

When the articles have been positioned in the load compartment 19 of the pressure vessel 1, pressure medium is fed into the pressure vessel 1, for instance by means of a compressor, a pressurized storage tank (a pressure supply), a cryogenic pump, or the like. The feeding of pressure medium into the pressure vessel 1 continues until a desired pressure is obtained inside the pressure vessel 1.

While, or after, feeding pressure medium into the pressure vessel 1, the furnace (the heating elements) 36 of the furnace chamber 18 is (are) activated and the temperature inside the load compartment is increased. If needed, the feeding of pressure medium continues and the pressure is increased until a pressure level has been obtained that is below the desired pressure for the pressing process, and at a temperature below the desired pressing temperature. Then, the pressure is increased the final amount by increasing the temperature in the furnace chamber 18, such that the desired pressing pressure is reached. Alternatively, the desired temperature and pressure is reached simultaneously or the desired pressure is reached after the desired temperature has been reached. A man skilled in the art realizes that any suitable method known in the art may be utilized to reach the desired pressing pressure and temperature. For instance, it is possible to equalize the pressure in the pressure vessel and a high pressure supply, and to then further pressurize the pressure vessel, by means of compressors, and further heat the pressure medium at the same time. The inner convention loop may be activated by the fan 30 included in the furnace chamber 18 in order to achieve an even temperature distribution.

In accordance with the embodiments described herein, the desired pressure is above approximately 200 bars, and the desired temperature is above approximately 400° C.

After a selected time period at which the temperature and pressure is maintained, i.e. the actual pressing phase, the temperature of the pressure medium is to be decreased, i.e. a phase of cooling is started. For embodiments of the pressing arrangement, the cooling phase may comprise, for example, one or more rapid cooling phases and/or a super rapid cooling phase, as described below.

The pressure medium used during the pressing phase can, when the temperature has been decreased enough, be discharged from the pressure vessel 1. For some pressure mediums, it may be convenient to discharge the pressure medium into a tank or the like for recycling.

After decompression, the pressure vessel 1 is opened such that the pressed articles 5 may be unloaded from the load compartment 19.

In FIG. 2, there is illustrated a hot isostatic pressing arrangement according to another embodiment of the present invention. In this embodiment, a first guiding passage 10 is formed between the inside of the outer walls of the pressure vessel and the casing 3. The first guiding passage 10 is used to guide the pressure medium from the top of the pressure vessel 1 to the bottom thereof.

Further, the heat insulated casing 3 comprises a heat insulating portion 7 and a housing 2 arranged to surround the heat insulating portion 7, which thermally seals off the interior of the pressure vessel 1 in order to reduce heat loss.

Moreover, a second guiding passage 11 is formed between the housing 2 of the furnace chamber 18 and the heat insulating portion 7 of the furnace chamber 18. The second guiding passage 11 is used to guide the pressure medium towards the top of the pressure vessel. The second guiding passage 11 is provided with inlets 14 for supplying pressure medium thereto, as well as an opening 13 at the top of the pressure vessel for allowing flow of the pressure medium into said first guiding passage 10.

The heat insulating portion 7 is provided with openings (or gaps) 15 for supplying pressure medium to the second guiding passage via the inlets 14. The inlets 14 are preferably located below the upper edge of the lower heat insulating portion 6. An outer convection loop is thereby formed by the first and second guiding passages 10, 11 as well as in a lower portion, below the lower heat insulating portion 6, of the pressure vessel 1.

Pressing of articles 5 in the pressing arrangement according to FIG. 2 is substantially performed as described above. However, when pressing articles in this pressing arrangement, the heat exchanger unit 33 is cooled by means of the pressure medium flowing from the first guiding passage 10 in which the pressure medium is cooled through contact with the outer walls of the pressure vessel 1. The outer walls are in turn cooled by a coolant, such as water, from the outside thereof. The pressure medium absorbs heat from the heat exchanger unit 33, which consequently dissipates heat, and is passed on through the openings 15 and into the second guiding passage 11. The valves 32 are then closed (not shown). In this embodiment, the heat exchanger unit is advantageously cooled during pressing and heating of articles to prepare the heat exchanger unit 33 for another super rapid cooling phase.

When cooling of articles is performed in the exemplifying pressing arrangement, as shown in FIG. 2, the heat exchanger unit 33 absorbs heat from the pressure medium, which in turn is heated by the articles 5, resulting in a cooling of the articles 5. For the embodiment shown in FIG. 2, the cooling phase only includes one phase, which is herein referred to as super rapid cooling or a phase of super rapid cooling. Super rapid cooling specifies that the heat exchanger unit 33 is used to cool the pressure medium before it enters the furnace chamber 18 through the passage 37 (the valves 32 are now open). Hence, the heat exchanger unit 33 then absorbs thermal energy from the articles 5 via the pressure medium.

Figure 3:
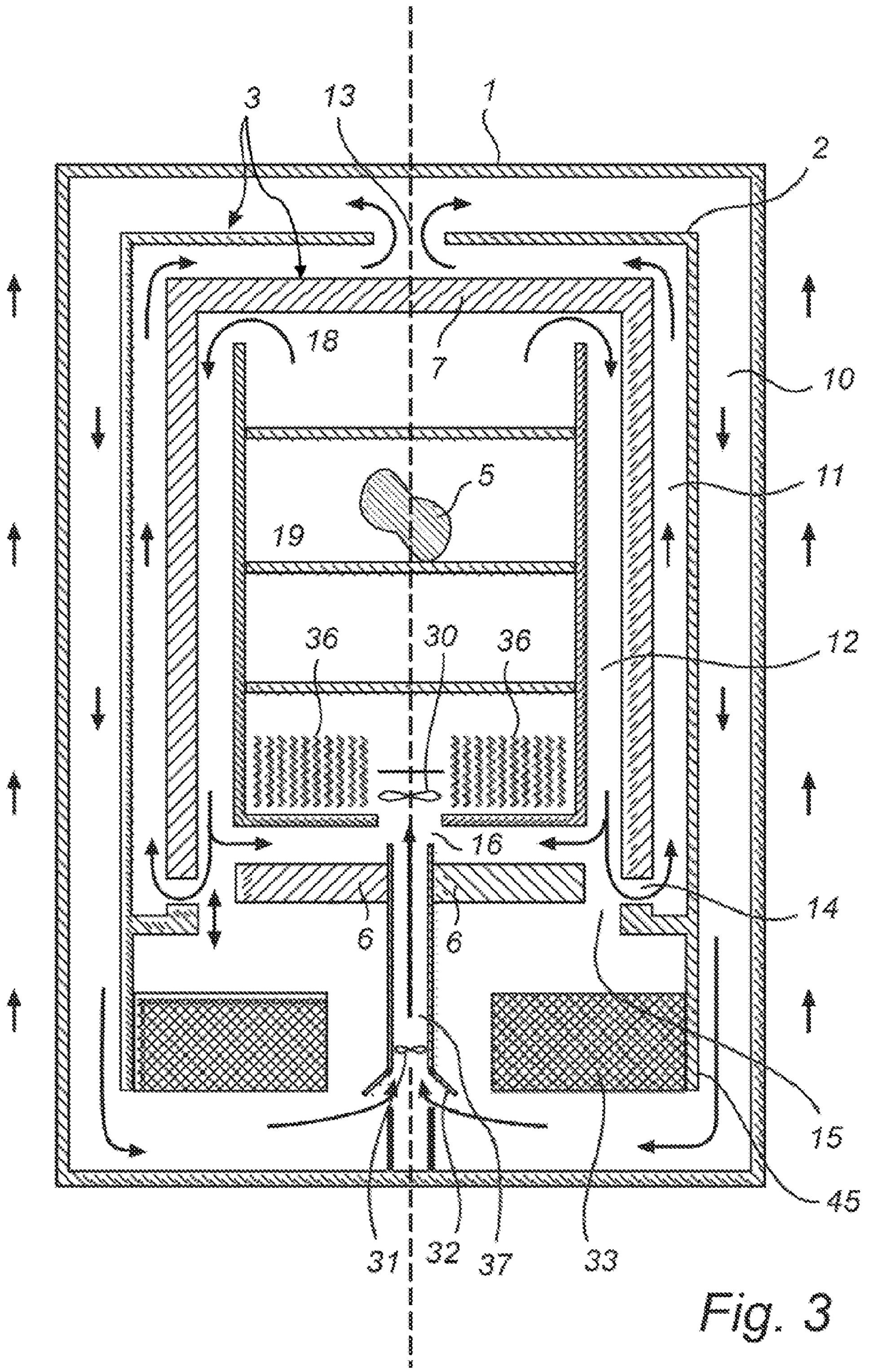
FIG. 3 is a side view of a pressing arrangement according to a further embodiment of the invention during the phase of rapid cooling.

Referring to FIG. 3, a further embodiment of the pressing arrangement according to the present invention is shown. Here, the pressure vessel 1 further comprises a fixed guiding arrangement 45, such as one or more walls, or baffles, for guiding the pressure medium in the first guiding passage 10 to a lower portion of the heat exchanger unit 33. Thereby, the heat exchanger unit 33 may dissipate heat differently, as compared to the heat exchanger in the pressing arrangement in FIG. 2, during the heating phase.

The pressing, heating and cooling phases of the exemplifying embodiment of FIG. 3, are performed in a similar manner as for the embodiment shown in FIG. 2. For efficient employment of the heat exchanger unit 33 in this embodiment, there may be provided at least one further entrance (not shown) into the channel 37, which may be located above the valves 32 in the vicinity of the lower heat insulating portion 6. In this manner, the flow of the pressure medium may be controlled to pass through the exchanger unit during the super rapid cooling phase.

Figure 4:
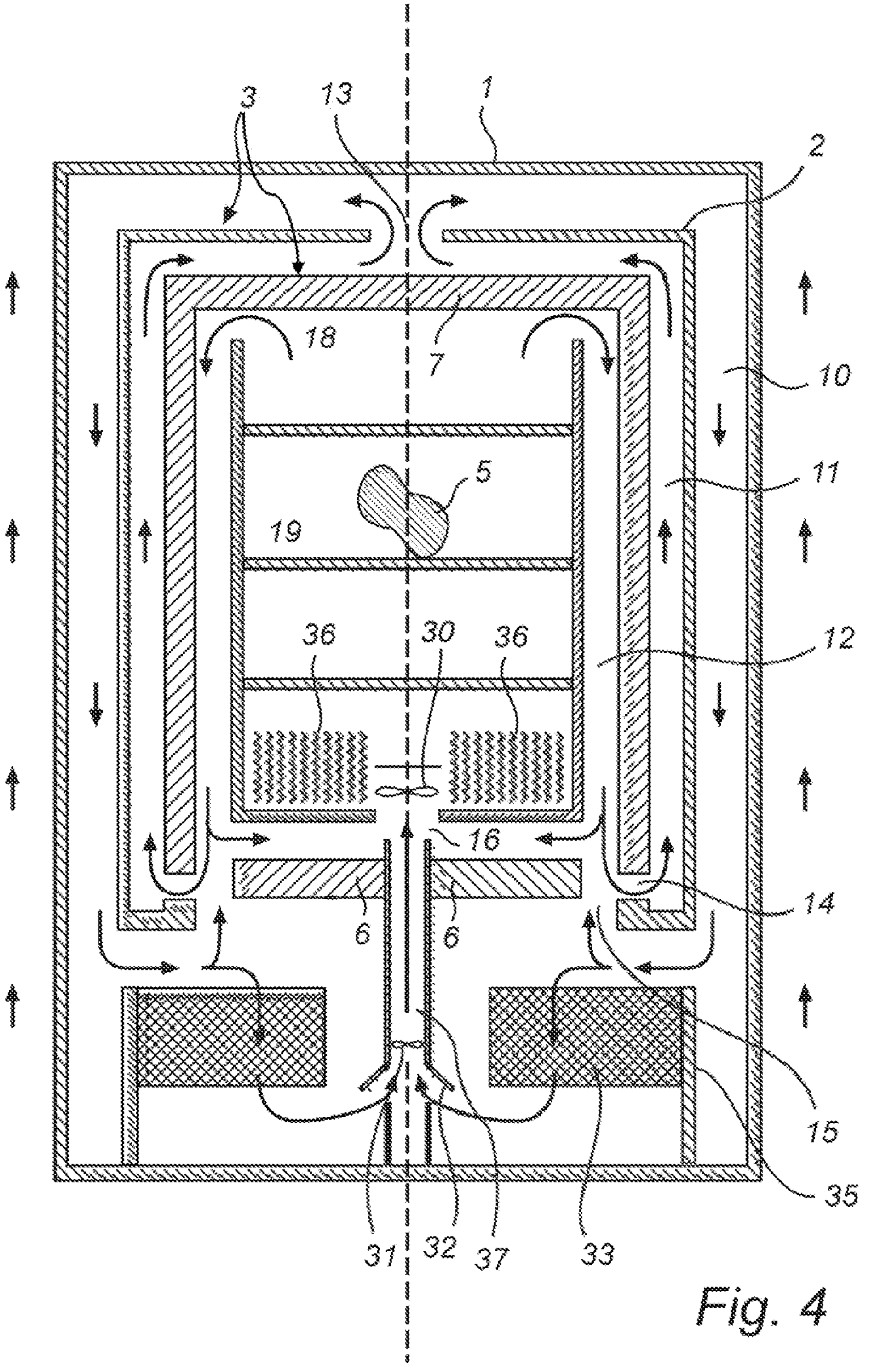
FIG. 4 is a side view of a pressing arrangement according to yet another embodiment of the invention during the phase of super rapid cooling.

In yet a further embodiment of the pressing arrangement according to the present invention, the pressure vessel 1 comprises an outer, movable guiding arrangement 35, as shown in FIG. 4. By means of the outer guiding arrangement, the flow of pressure medium through the heat exchanger unit 33 may be controlled to have a downward or upward direction. In addition, the flow of pressure medium may be controlled to pass by and not flown through the heat exchanger unit 33, and thereby not exchanging thermal energy therewith. The outer guiding arrangement may assume an upper position, a lower position or a position somewhere between the upper and lower position.

For the exemplifying embodiment of the pressing arrangement according to FIG. 4, the cooling phase comprises three phases, which herein are referred to as rapid cooling with cold heat exchanger unit 33, rapid cooling with hot heat exchanger unit 33, and super rapid cooling.

During super rapid cooling of the articles in the pressing arrangement in accordance with FIG. 4, the outer guiding arrangement 35 is positioned in its lower position. Thereby, the flow of pressure medium will have a downward direction through the heat exchanger unit 33. If the fan 31 produces a sufficient flow through the passage 37, there will be a downward flow of pressure medium from the openings 15, while the flow of pressure medium at the openings 15 will have an upward direction for a more moderate flow through the passage 37. Consequently, when the fan 31 has a relatively high speed, the outer convection loop will be saturated and the flow will stop increasing.

If it is desired not to use the heat exchanger unit 33 for super rapid cooling for a selected period of time, it is possible to operate the pressing arrangement in rapid cooling with the heat exchanger unit 33 being hot or cold. Here, the terms “hot” and “cold” are given in relation to the temperature of the pressure medium surrounding the heat exchanger unit. In this manner, if the heat exchanger unit 33 is colder than the pressure medium, the booster effect of the heat exchanger unit 33 may, for example, be applied at a different stage in the treatment cycle.

If the heat exchanger unit 33 is hot, i.e. the temperature of the heat exchanger unit 33 being greater than the temperature of the pressure medium around it, the outer guiding arrangement 35 is positioned in its upper position, whereby the colder pressure medium is allowed to pass under the heat exchanger unit 33 and into the passage 37. In case the fan 31 is operated at a relatively low speed, a portion of the pressure medium will flow through the heat exchanger unit 33, into the openings 15 and further into the second guiding passage 11. It is, however, preferred to operate the fan such that the majority of the pressure medium will pass under the heat exchanger unit 33 and into the passage 37, via the valves 32, which are open.

If the heat exchanger unit 33 is cold, i.e. the temperature of the heat exchanger unit 33 being less than the temperature of the pressure medium around it, the outer guiding arrangement 35 is positioned in its lower position, whereby the hotter pressure medium is allowed to pass above the heat exchanger unit 33 and into the passage 37, via the open valves 32. Further, a portion of the pressure medium will enter the openings 15 and pass into the second guiding passage 11.

When heating the articles, the outer guiding arrangement is positioned in its upper position. Thereby, the flow of pressure medium will have an upward direction through the heat exchanger unit 33. The valves 32 are closed. The pressure medium, which is cooled by the outer walls of the pressure vessel 1, is cooling the heat exchanger unit 33 and will pass through the openings 15 and pass into the second guiding passage 11. In this manner, the heat exchanger unit 33 is prepared for another cooling phase.

Figure 5:
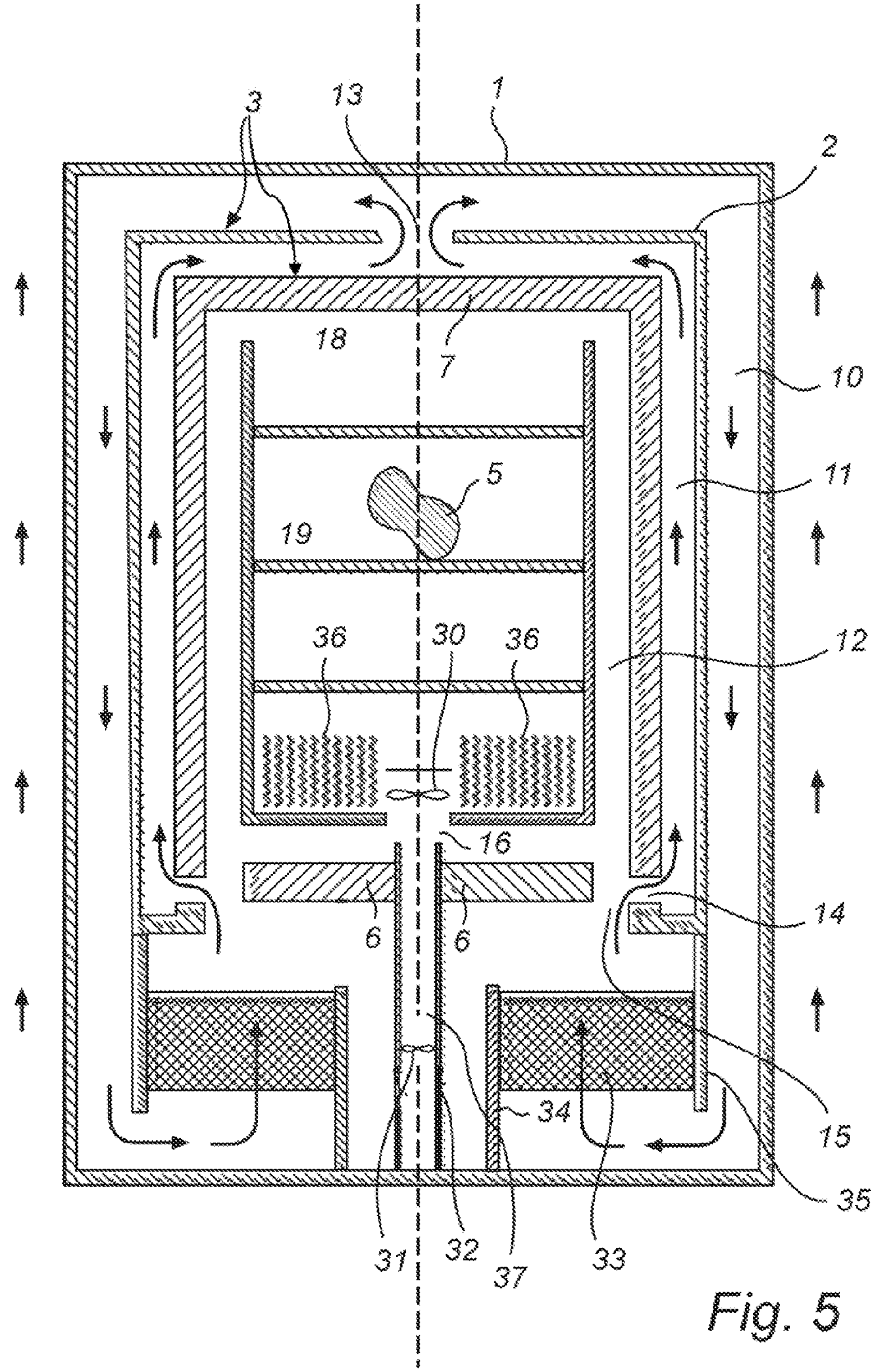
FIG. 5 is a side view of a pressing arrangement according to a still further embodiment of the invention during the phase of heating and/or pressing.

According to FIG. 5, a still further embodiment of the pressing arrangement in accordance with the present invention is shown. Here, the pressure vessel 1 further comprises an inner, movable guiding arrangement 34 for controlling the flow of the pressure medium. Thus, the pressure vessel 1 comprises inner and outer movable guiding arrangements 34, 35. The inner and outer guiding arrangements 34, 35 allow for an improved control of the flow of pressure medium through or past the heat exchanger unit 33, as compared to the embodiments comprising only an outer guiding arrangement 35.

With reference to FIG. 5, pressing and heating of the articles 5 is shown. The flow of the pressure medium passes through the heat exchanger unit 33 into the first guiding passage 11 via the openings 15. The valves 32 are now closed. In this manner, the heat exchanger unit 33 is cooled during heating and pressing of the articles 5, whereby it is possible to begin another pressing phase after the phase of cooling the articles 5 (as described below) has been completed.

For the pressing arrangement according to FIG. 5, the cooling phase comprises different phases, super rapid cooling, rapid cooling with hot heat exchanger unit 33, and rapid cooling with cold heat exchanger unit 33. Again, the terms “hot” and “cold” are to be interpreted in relation to the temperature of the pressure medium surrounding the heat exchanger unit 33.

Figure 6:
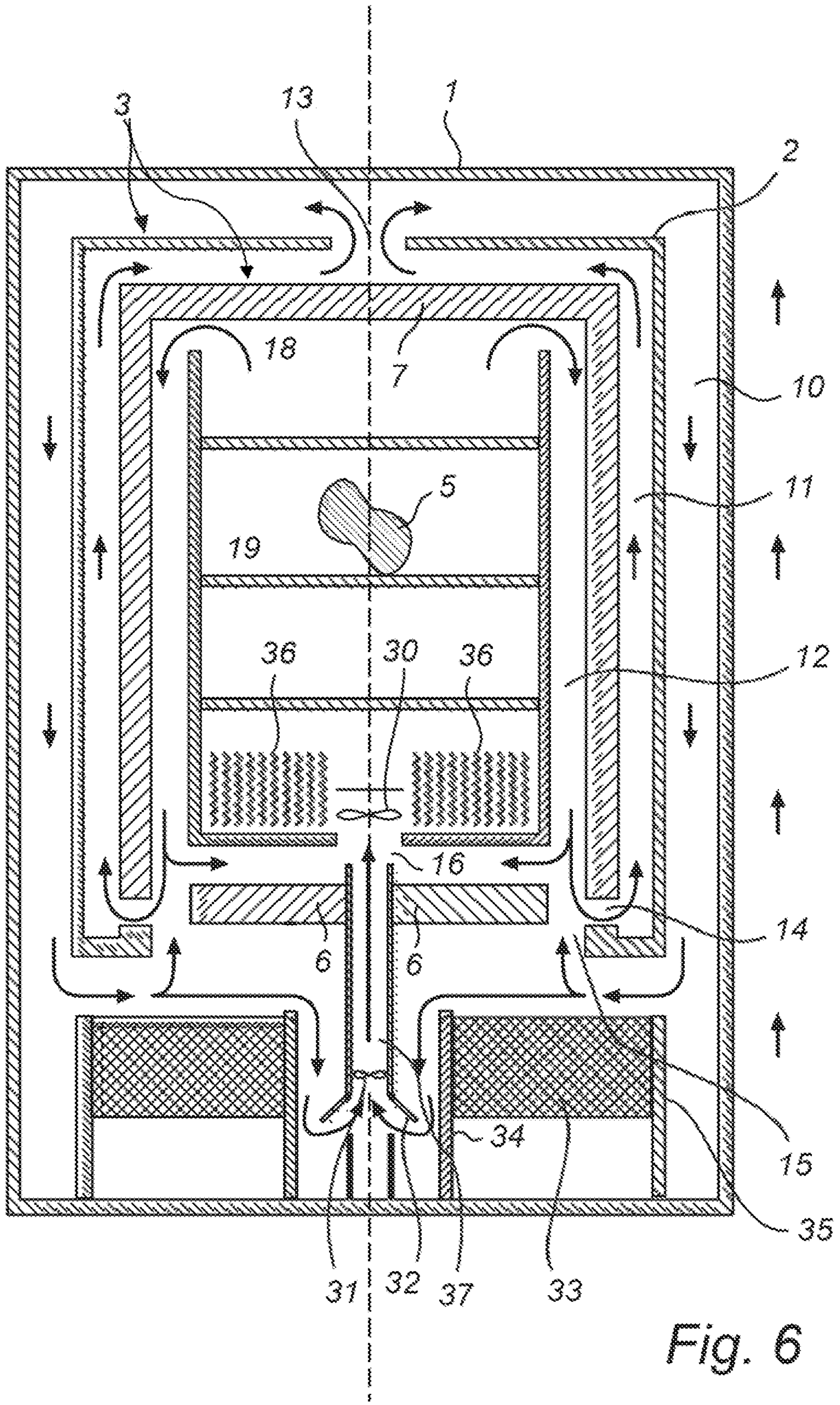
FIG. 6 is a side view of a pressing arrangement according to FIG. 5 during the phase of rapid cooling with cold, inactive heat exchanger unit.
Figure 7:
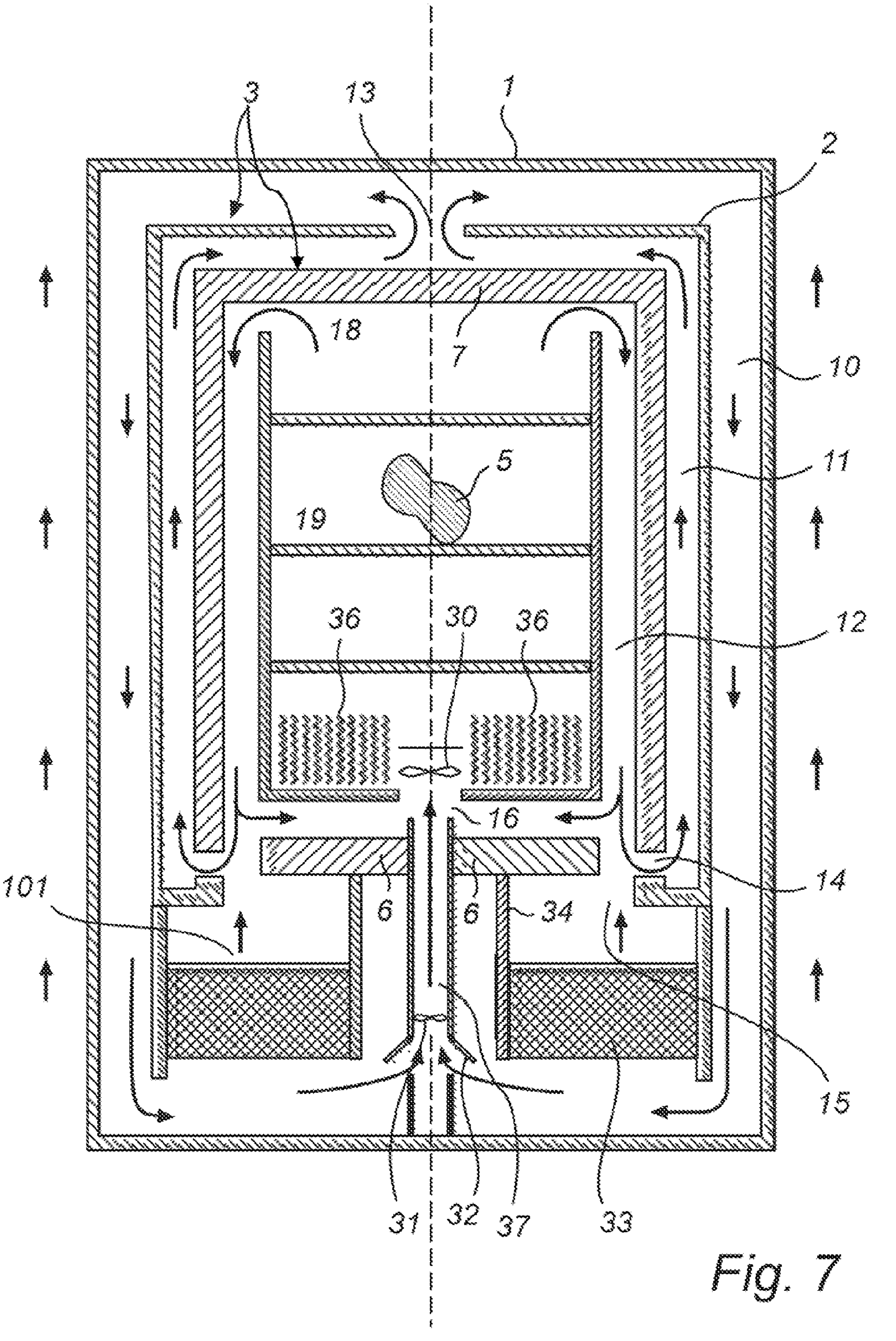
FIG. 7 is a side view of a pressing arrangement according to FIG. 5 during the phase of rapid cooling with hot, inactive heat exchanger unit.
Figure 8:
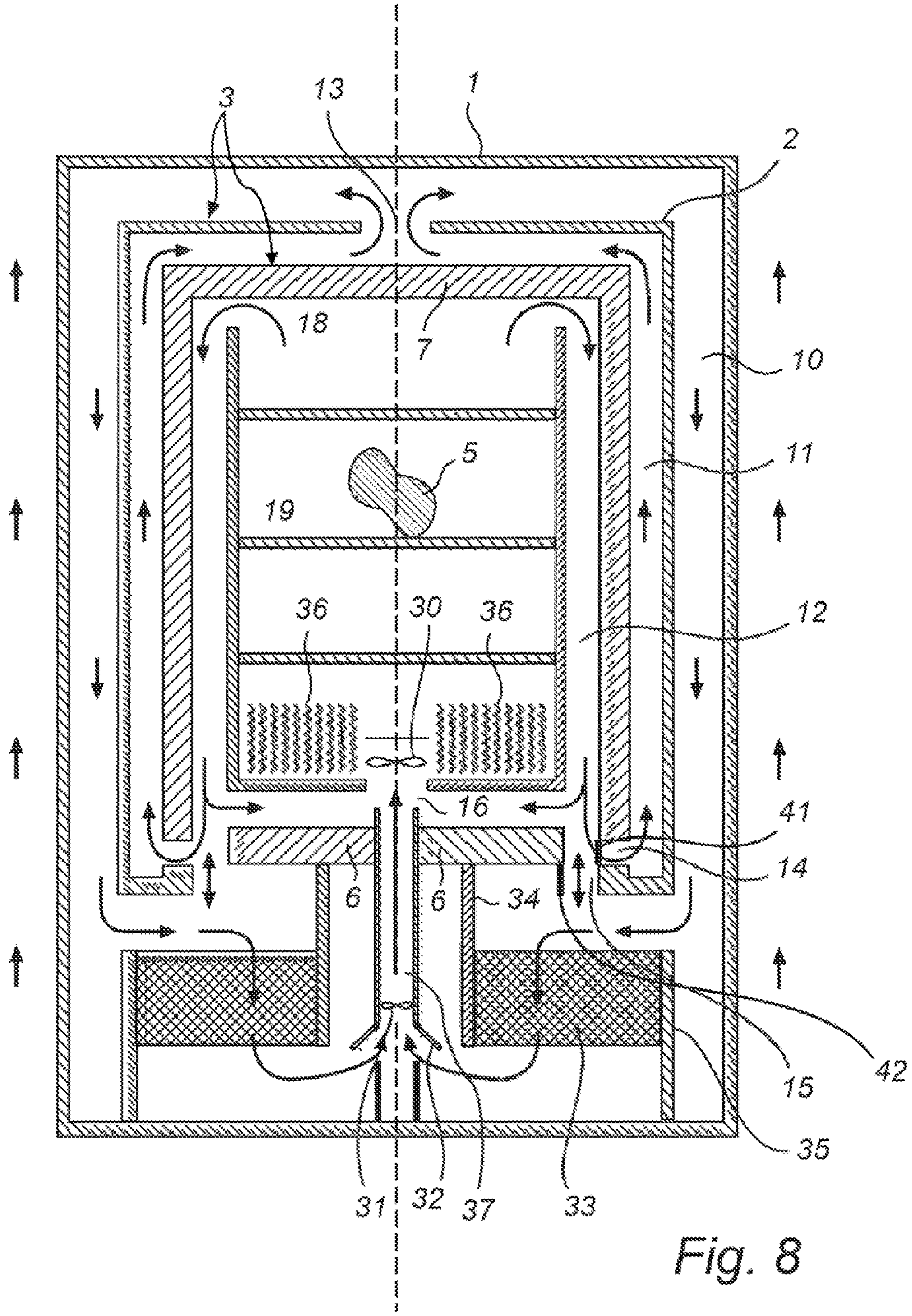
FIG. 8 is a side view of a pressing arrangement according to FIG. 5 during the phase of super rapid cooling.

With reference to FIG. 6 to FIG. 8, the cooling phases of the pressing arrangement according to FIG. 5 are explained in more detail.

In the phase of rapid cooling with cold heat exchanger unit 33, as demonstrated in FIG. 6, the flow of the pressure medium passes above the heat exchanger unit 33, further into the passage 37 via the open valves 32, through the lower heat insulating portion 6, and into the furnace chamber 18. As can be seen from FIG. 6, the outer and inner guiding arrangements 34, 35 are located in their lower positions. In this manner, the booster effect of the heat exchanger unit 33 may be dispensed with and used at a different occasion, if desired.

In accordance with FIG. 7, the phase of rapid cooling with hot heat exchanger unit 33 is shown. Now, the inner and outer guiding arrangements 34, 35 are located in their upper positions. In this manner, the flow of the pressure medium is guided underneath the heat exchanger unit 33 and into the passage 37 via the valves 32, which are open. This is appropriate when the temperature of the pressure medium is less than the temperature of the heat exchanger unit 33. In this phase, only the cooling effect from the pressure vessel wall is used for cooling the pressure medium, which in turn is cooling the articles 5. Hence, no booster effect is present. As for the embodiment shown in FIG. 7, when the speed of the fan 31, during rapid cooling with hot heat exchanger unit, is relatively low, there will be a flow through the heat exchanger unit 33 in the upward direction, as indicated by arrows 101.

In the super rapid cooling phase, as shown in FIG. 8, the inner valve arrangement 34 is located in its upper position and the outer valve arrangement 35 is located in its lower position, whereby the flow of pressure medium is directed downwards through the heat exchanger unit 33. The valves 32 are open in order to allow the pressure medium to enter the passage 37 and to be forced into the furnace chamber 18 by means of the fan 31.

Further, the hot isostatic pressing arrangement according to the above described embodiments may, such as schematically illustrated in FIG. 8, comprise controllable restrictions 41 at the inlets 14 for further improvement of the booster effect achieved by the heat exchanger unit. The restrictions 41 may be valves or the like. Preferably, the restrictions 41 are adjusted to allow a small flow of pressure medium through the inlets 14 during the phase of super rapid cooling.

In yet further embodiments of the hot isostatic pressing arrangement, the openings 15 may, such as schematically illustrated in FIG. 8, be provided with controllable restrictions 42 for yet further improvement of the booster effect achieved by the heat exchanger unit. Again, the restrictions 42 may be valves or the like. For example, during rapid cooling without using the heat exchanger unit, it may be advantageous to completely close the openings 15, by means of the restrictions 42.

Moreover, in embodiments of the hot isostatic pressing arrangement, the orifices 16 may be provided with controllable restrictions for further improvement of the booster effect.

In further embodiments, the inner and/or outer guiding arrangements may be replaced with a fixed wall portion having upper and lower valves, such as to control the flow of the pressure medium as described in detail above. For example, closing the upper valves and opening the lower valves would correspond to setting the guiding arrangement in the upper position.

Further embodiments of the present invention will become apparent for a man skilled in the art after reading the description above. For instance, a further embodiment may be provided by means of combining fixed outer valves with movable inner valves or, alternatively, fixed inner valves in combination with movable outer valves. Furthermore, the man skilled in the art would realize that it is possible to construct a pressing arrangement having only movable inner valves.

Even though the present description and drawings disclose embodiments and examples, including selections of components, materials, temperature ranges, pressure ranges, etc., the invention is not restricted to these specific examples. Numerous modifications and variations can be made without departing from the scope of the present invention, which is defined by the accompanied claims.

The invention claimed is:

1. A hot isostatic pressing arrangement for treatment of articles by hot isostatic pressing, comprising:

a pressure vessel including:

a furnace chamber comprising a heat insulated casing and a furnace for heating of a pressure medium during pressing, the furnace chamber being arranged to receive and hold the articles, and a passive heat exchanger unit located below said furnace chamber and arranged for exchanging thermal energy with the pressure medium, wherein the passive heat exchanger unit is arranged inside the pressure vessel such that the passive heat exchanger unit is completely enclosed by the pressure vessel, and does not require an exchange of fluids with a source that is external to the pressure vessel, during operation of the pressing arrangement, wherein the passive heat exchanger unit is arranged such that the pressure medium is used for cooling and heating the passive heat exchanger unit, whereby thermal heat can be transferred from the pressure medium to the passive heat exchanger unit when the passive heat exchanger unit is cooler than the pressure medium during cooling of the articles, wherein thermal heat of the pressure medium is absorbed by the passive heat exchanger unit, and from the passive heat exchanger unit to the pressure medium when the pressure medium is cooler than the passive heat exchanger unit during heating of the articles, wherein thermal heat having been absorbed in the passive heat exchanger unit is dissipated to the pressure medium.

2. The hot isostatic pressing arrangement according to claim 1, wherein the furnace chamber includes a closed top.

3. The hot isostatic pressing arrangement according to claim 1, wherein the heat insulated casing comprises a lower heat insulating portion, wherein the passive heat exchanger unit is located below said lower heat insulating portion.

4. The hot isostatic pressing arrangement according to claim 1, wherein a first guiding passage is formed between an outer wall of the pressure vessel and the casing, said first guiding passage being arranged to guide the pressure medium in the downward direction along the inside of said outer wall, whereby thermal energy is exchangeable between the pressure medium and said outer wall.

5. The hot isostatic pressing arrangement according to claim 4, further comprising at least one device for cooling, arranged to provide a flow of coolant along the outer wall of the pressure vessel.

6. The hot isostatic pressing arrangement according to claim 1, wherein the pressure vessel further contains a flow generator for forcing the pressure medium into the furnace chamber.

7. The hot isostatic pressing arrangement according to claim 6, wherein the flow generator is a fan.

8. The hot isostatic pressing arrangement according to claim 6, wherein the flow generator is an ejector.

9. The hot isostatic pressing arrangement according to claim 6, wherein the flow generator is a pump.

10. The hot isostatic pressing arrangement according to claim 1, wherein the pressure vessel further contains a movable guiding arrangement arranged for guiding the flow of pressure medium past the passive heat exchanger unit for avoiding thermal energy exchange between the pressure medium and the passive heat exchanger unit, or through the passive heat exchanger unit for allowing thermal energy exchange between the pressure medium and the passive heat exchanger unit.

11. The hot isostatic pressing arrangement according to claim 10, wherein the guiding arrangement comprises a first valve arrangement arranged peripherally of the passive heat exchanger unit.

12. The hot isostatic pressing arrangement according to claim 10, wherein the guiding arrangement comprises a second valve arrangement and wherein the passive heat exchanger unit is arranged peripherally of the second valve arrangement.

13. The hot isostatic arrangement according to claim 1, wherein the casing comprises a heat insulating portion and a housing arranged around said heat insulating portion, whereby a second guiding passage is formed between said heat insulated portion and the housing, and is arranged to guide the pressure medium in the upward direction in said second guiding passage.

14. The hot isostatic arrangement according to claim 13, wherein the second guiding passage is provided with one or more inlets for supplying the pressure medium thereto, wherein the one or more inlets are provided with first controllable restrictions.

15. The hot isostatic arrangement according to claim 14, wherein the first controllable restrictions are valves.

16. The hot isostatic arrangement according to claim 14, wherein the heat insulating portion is provided with openings for supplying the pressure medium to the second guiding passage via the inlets, wherein the openings are provided with second controllable restrictions.

17. The hot isostatic arrangement according to claim 16, wherein the second controllable restrictions are valves.

18. The hot isostatic arrangement according to claim 15, wherein the heat insulating portion is provided with openings for supplying the pressure medium to the second guiding passage via the inlets, wherein the openings are provided with second controllable restrictions.

19. The hot isostatic arrangement according to claim 18, wherein the second controllable restrictions are valves.

* * * * *